(12) United States Patent
Johnson

(10) Patent No.: US 10,263,865 B2
(45) Date of Patent: Apr. 16, 2019

(54) NETWORK AVAILABILITY MEASUREMENT AGGREGATION AND CORRELATION

(71) Applicant: ADTRAN, INC., Huntsville, AL (US)

(72) Inventor: Milton Jay Johnson, Owens Cross Roads, AL (US)

(73) Assignee: ADTRAN, Inc., Huntsville, AL (US)

( * ) Notice: Subject to any disclaimer, the term of this patent is extended or adjusted under 35 U.S.C. 154(b) by 199 days.

(21) Appl. No.: 15/470,312

(22) Filed: Mar. 27, 2017

(65) Prior Publication Data
US 2018/0278501 A1 Sep. 27, 2018

(51) Int. Cl.
*H04L 12/26* (2006.01)
(52) U.S. Cl.
CPC .......... *H04L 43/065* (2013.01); *H04L 43/04* (2013.01); *H04L 43/06* (2013.01); *H04L 43/0805* (2013.01); *H04L 43/0829* (2013.01); *H04L 43/0852* (2013.01); *H04L 43/12* (2013.01)

(58) Field of Classification Search
USPC .......................................................... 709/224
See application file for complete search history.

(56) References Cited

U.S. PATENT DOCUMENTS

| 8,521,774 | B1 * | 8/2013 | Cai | .................. G06F 17/30457 707/776 |
|---|---|---|---|---|
| 2006/0092847 | A1 | 5/2006 | Mohan | |
| 2006/0271601 | A1 * | 11/2006 | Fatula, Jr. | ........... G06F 11/1464 |
| 2006/0294220 | A1 * | 12/2006 | Asahara | .............. H04L 41/0813 709/224 |
| 2010/0195516 | A1 * | 8/2010 | McReynolds | ......... H04L 41/142 370/252 |
| 2010/0281388 | A1 * | 11/2010 | Kane | ................... H04L 41/0213 715/736 |

(Continued)

OTHER PUBLICATIONS

International Search Report for PCT/US2018/024326 dated Jun. 8, 2018, 5 pages.

(Continued)

*Primary Examiner* — Jude Jean Gilles
(74) *Attorney, Agent, or Firm* — Fish & Richardson P.C.

(57) ABSTRACT

Methods, systems, and apparatus for correlating communications measurements are disclosed. In one aspect, a communications measurement of a maintenance entity (ME) is received. The communications measurement is stored and correlated with a maintenance entity group (MEG) identifier and an ME identifier received with the communications measurement. The stored communications measurement is registered with one or more previously received communications measurements. Each previously received communications measurement is associated with an availability indicator corresponding to an availability of the ME at a time the particular communications measurement was obtained. An availability of the ME during a given time interval is determined based on availability indicators of consecutive communications measurements for the ME. Availability indicators of at least one of the one or more previously received communications measurements are changed after the ME has been determined to be unavailable during the given time interval.

20 Claims, 6 Drawing Sheets

(56) References Cited

U.S. PATENT DOCUMENTS

| | | | |
|---|---|---|---|
| 2014/0323087 A1* | 10/2014 | Huang | H04W 48/16 |
| | | | 455/411 |
| 2015/0302481 A1* | 10/2015 | Callahan | G06Q 30/0269 |
| | | | 705/7.29 |
| 2016/0330096 A1 | 11/2016 | Johnson et al. | |
| 2017/0262508 A1* | 9/2017 | Garcia | G06F 17/30525 |

OTHER PUBLICATIONS

Mef Forum: "MEF 35.1: Service QAM Performance Monitoring Implementation Agreement, 1-20; May 31, 2015 (May 31, 2015), XP055482080. Retrieved from the Internet: URL:https://wi ki.mef net/download/attachments/59839101/MEF_35.1.pdf?api=v2 [retrieved on Jun. 7, 2018] Chapter 8.1, "Frame delay measurements". Chapter 8.2, "Frame loss measurements. Paragraph 10.2.5 "Measurement Behaviour during Unavailable time and Maintenance intervals" pp. 1-58.

* cited by examiner

Current availability state: Available

| MEG identifier | ME identifier | measurement type | measurement | availability indicator | measurement type | availability indicator |
|---|---|---|---|---|---|---|
| Test Meg, Level 3 | 1 | Loss | low loss | Available | delay | Available |
| Test Meg, Level 3 | 1 | Loss | low loss | Available | delay | Available |
| Test Meg, Level 3 | 1 | Loss | high loss | Available | delay | Available |
| Test Meg, Level 3 | 1 | Loss | high loss | Available | delay | Available |
| Test Meg, Level 3 | 1 | Loss | high loss | Available | delay | Available |
| Test Meg, Level 3 | 1 | Loss | high loss | Available | delay | Available |
| Test Meg, Level 3 | 1 | Loss | high loss | Available | delay | Available |
| Test Meg, Level 3 | 1 | Loss | high loss | Available | delay | Available |
| Test Meg, Level 3 | 1 | Loss | high loss | Available | delay | Available |
| Test Meg, Level 3 | 1 | Loss | high loss | Available | delay | Available |
| Test Meg, Level 3 | 1 | Loss | high loss | Available | delay | Available |
| Test Meg, Level 3 | 1 | Loss | | | delay | Available |

Time measurements were obtained ↓

FIG. 4B

Current availability state: Unavailable

| MEG identifier | ME identifier | measurement type | measurement | availability indicator | measurement type | availability indicator |
|---|---|---|---|---|---|---|
| Test Meg, Level 3 | 1 | Loss | low loss | Available | delay | Available |
| Test Meg, Level 3 | 1 | Loss | low loss | Available | delay | Available |
| Test Meg, Level 3 | 1 | Loss | high loss | Unavailable | delay | Unavailable |
| Test Meg, Level 3 | 1 | Loss | high loss | Unavailable | delay | Unavailable |
| Test Meg, Level 3 | 1 | Loss | high loss | Unavailable | delay | Unavailable |
| Test Meg, Level 3 | 1 | Loss | high loss | Unavailable | delay | Unavailable |
| Test Meg, Level 3 | 1 | Loss | high loss | Unavailable | delay | Unavailable |
| Test Meg, Level 3 | 1 | Loss | high loss | Unavailable | delay | Unavailable |
| Test Meg, Level 3 | 1 | Loss | high loss | Unavailable | delay | Unavailable |
| Test Meg, Level 3 | 1 | Loss | high loss | Unavailable | delay | Unavailable |
| Test Meg, Level 3 | 1 | Loss | high loss | Unavailable | delay | Unavailable |
| Test Meg, Level 3 | 1 | Loss | high loss | Unavailable | delay | Unavailable |

Time measurements were obtained →

FIG. 4C

NETWORK AVAILABILITY MEASUREMENT AGGREGATION AND CORRELATION

BACKGROUND

This specification relates to Ethernet performance measurements.

International Telecommunication Union (ITU) standard Y.1731 defines methods to determine performance measurement (e.g., frame delay, frame delay variation, frame loss ratio) on Ethernet networks. Y.1731 is used to measure the performance of point-to-point Ethernet Virtual Private Line (E-LINE) circuits and multi-point Ethernet Virtual Private LAN (E-LAN) circuits. Metro Ethernet Forum standard MEF 10.2.1 defines availability and resiliency calculations for point-to-point E-LINE circuits and multi-point E-LAN circuits, based on Y.1731 measurement values.

SUMMARY

In general, one innovative aspect of the subject matter described in this specification can be embodied in methods for aggregation and correlation of Y.1731 and MEF 10.2.1 measurements. One example computer-implemented method includes receiving, from a network node and by a metric device, a given communications measurement of a maintenance entity (ME) that includes the network node, the ME including two network nodes, storing, by the metric device, the given communications measurement in a measurement database, the stored given communications measurement correlated with a maintenance entity group (MEG) identifier received with the given communications measurement and an ME identifier received with the given communications measurement, an MEG including multiple MEs, registering, by the metric device, the stored given communications measurement with one or more previously received communications measurements, each previously received communications measurement associated with an availability indicator corresponding to an availability of the ME at a time the particular communications measurement was obtained, determining, based on availability indicators of consecutive communications measurements for the ME, an availability of the ME during a given time interval, changing, by the metric device and in the measurement database, availability indicators of at least one of the one or more previously received communications measurements after the ME has been determined to be unavailable during the given time interval, and providing, by the metric device, a report indicating the unavailability of the ME.

Particular embodiments of the subject matter described in this specification can be implemented so as to realize one or more of the following advantages. For example, the methods, devices, and/or systems described in the present disclosure can use a designated device (e.g., an MEF 10.2.1 metric device) to collect measurements of maintenance entities (MEs) in a maintenance entity group (MEG). Maintenance end points (MEPs) (i.e., end points of MEs) can report measurements to the designated device at regular intervals. In doing so, the designated device can learn the MEG topology using information (e.g., local and remote MEP IDs, MEG ID) received with the measurements from the MEPs without provisioning the MEG configuration for all Ethernet circuits in a monitored service area. Changes to the MEG topology (e.g., adding new ME(s) to the MEG) can be learned by the designated device once measurements of the newly added ME(s) are received. In addition, there is no need for delay measurements and loss measurements of an ME to be sent from the same MEP of the ME. The designated device can correlate the delay and loss measurements of the same ME in a measurement database, and pass events (e.g., availability state change of the particular ME) between the correlated delay and loss measurements of the same ME. Since measurements are collected and stored in the measurement database in the designated device, the designated device can provide comprehensive Ethernet performance measurements (e.g., availability, max delay) of the entire MEG to Ethernet service subscribers.

While some aspects of this disclosure refer to computer-implemented software embodied on tangible media that processes and transforms data, some or all of the aspects may be computer-implemented methods or further included in respective systems or devices for performing the described functionality. The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 4B is an example database illustrating stored measurements of an ME before the ME is determined to be unavailable.

FIG. 4C is an example database illustrating stored measurements of the ME after the ME is determined to be unavailable.

Like reference numbers and designations in the various drawings indicate like elements.

DETAILED DESCRIPTION

Figure 1:
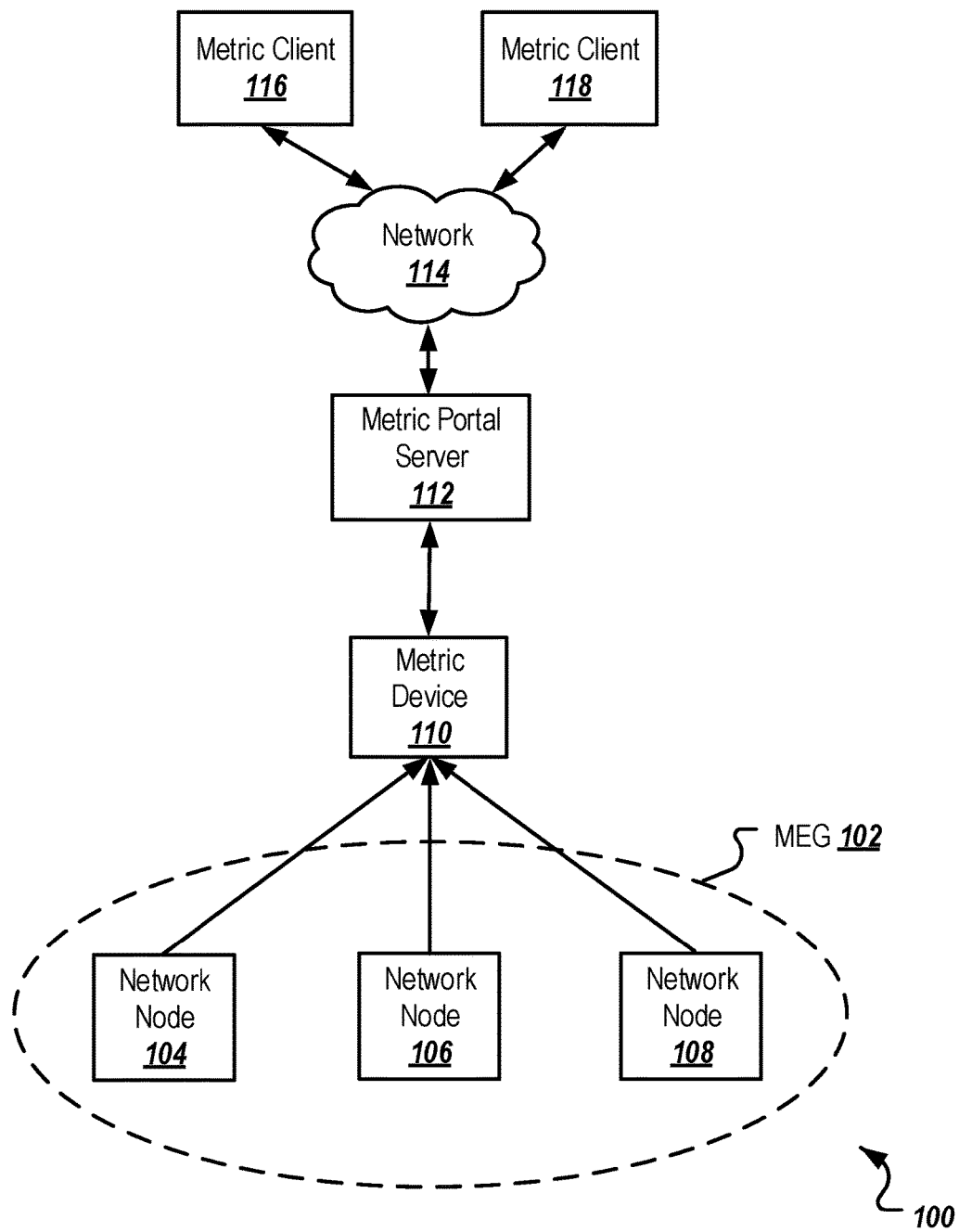
FIG. 1 is a block diagram illustrating an example networking environment for aggregation and correlation of measurements.

This document describes methods, systems, and apparatus for aggregation and correlation of measurements obtained from network nodes in a telecommunications network. For example, a metric device can collect measurements (e.g., delay measurements, loss measurements) from network nodes in a maintenance entity group (MEG), and correlate measurements from the same maintenance entity (ME) in the same MEG at the same priority of service. Although this disclosure refers to Ethernet performance measurements based on Y.1731 and MEF 10.2.1 standards for purposes of example, the subject matter of this document can be applied to other types of networks and/or other standards that measure network performance.

According to Y.1731, Ethernet performance measurements are performed point-to-point between two end points of a circuit (e.g., a point-to-point E-LINE circuit, a multi-point E-LAN circuit). The point-to-point relationships are called maintenance entities (MEs). MEs measure network performance (e.g., delay, loss) between two end points within a circuit. The two end points in an ME are maintenance end points (MEPs) of the ME. All the point-to-point relationships in a given circuit are grouped together into a maintenance entity group (MEG). For example, an MEG for a point-to-point E-Line circuit has only one circuit leg (e.g., an end-point to end-point connection), which may have multiple ME measurements. An MEG for an n-point E-LAN circuit has $$\frac{n \times (n-1)}{2}$$

circuit legs. For an E-LAN, all circuit legs must be available for the E-LAN to be considered available. Measurements for an ME are initiated from one end point of the ME. Measurements can be unidirectional or bidirectional. For bidirectional measurements, measurement reporting is performed by the same end point that initiates the measurements. For unidirectional measurements, one end point initiates measurements, and the other end point reports the measurements result. It is common within an ME and an MEG that some measurements (e.g., delay measurements) of the ME are reported from one end point of the ME and other measurements (e.g., loss measurements) of the ME are reported from the other end point of the ME. Reporting from each end point of an ME may be caused by network equipment configuration requirements and/or balancing work load of performing measurements across multiple MEPs in an MEG.

MEF 10.2.1 defines availability metrics for Ethernet circuits. The availability metrics create a dependence on frame loss measurements of an ME to calculate correct value of delay measurements for the ME. For example, in MEF 10.2.1, availability performance is based on service frame loss during a specified number (e.g., 10) of consecutive small time intervals. In addition, in MEF 10.2.1, when an ME is determined to be unavailable for a period of time, frame delay measured during that period may not be used to calculate the correct value of delay measurements for the ME. To calculate correct value of metrics for an ME according to MEF 10.2.1, both delay and loss measurements of the ME must be reported by the same MEP of the ME. In addition, availability of an n-point E-LAN circuit is determined by simultaneous availability of each of the $$\frac{n \times (n-1)}{2}$$

circuit legs mat comprise the E-LAN. To calculate availability of the n-point E-LAN circuit, the calculation is generally performed by an entity (e.g., a management server) that has knowledge of the MEG configuration and retrieves metric data from all MEs in the MEG (e.g., "pull" model).

The disclosed subject matter addresses problems that arise when delay and loss measurements of an ME are reported by different MEPs of the ME and/or provisioning an MEG configuration is unavailable. In the present disclosure, a "pull" model for gathering metrics is replaced with a "push" model. In the "push" model, reporting devices (e.g., devices containing MEPs that report measurements) transfer the measurements to a designated device (e.g., an MEF 10.2.1 metric device) at regular intervals. The metric device is placed in reporting paths between the reporting devices reporting the measurements, and a management server that gathers the metrics and reports results to users (e.g., Ethernet service subscribers). The metric device is configured to be the target of measurement reports from reporting devices.

When reporting measurements of an ME are received, the metric device can store the reporting measurements in a measurement database. In addition, the metric device can correlate (e.g., group or link) loss measurements with delay measurements from the same ME in the same MEG based on the measurement reports for these measurements identifying a same MEG ID and/or MEP ID. Since the delay measurements and the loss measurements from the same ME in the same MEG can be correlated automatically by the metric device, there is no need for the delay measurements and the loss measurements from the same ME in the same MEG to be sent from the same MEP of the ME. In doing so, when the availability state of an ME changes (e.g., from available to unavailable) based on calculation of loss measurements of the ME according to MEF 10.2.1, correlated delay measurements of the ME can be informed. Any correlated delay measurements of the ME within an unavailable interval of the ME can be marked and will not be used in service performance calculation of the ME. In addition, the metric device can construct (e.g., automatically learn) the MEG topology using information (e.g., local and remote MEP IDs, MEG ID, measuring device network address) received with the measurements. Since the MEG topology can be learned by the metric device, there is no need for the metric device to provision the MEG configuration for all Ethernet circuits in a monitored service area. With the constructed MEG measurement topology and measurements from all MEs in the MEG, the metric device can provide comprehensive Ethernet performance measurements (e.g., availability, max delay) of the entire MEG to Ethernet service subscribers.

FIG. 1 is a block diagram illustrating an example networking environment 100 for aggregation and correlation of measurements. As illustrated in FIG. 1, the environment 100 includes a maintenance entity group (MEG) 102 that provides Ethernet service to metric clients 116 and 118, a metric device 110, a metric portal server 112, network 114, and the metric clients 116 and 118. In some implementations, the environment 100 may include additional and/or different components not shown in the block diagram, such as one or more MEGs, another type of network that provides network services, or a combination of these and other technologies. In some implementations, components may also be omitted from the environment 100. As illustrated in FIG. 1, the metric device 110 is depicted as a single metric device, but may be comprised of more than one metric devices without departing from the scope of this disclosure.

As illustrated, the MEG 102 includes network nodes 104, 106, and 108. Each network node may contain one or more MEPs of the MEG 102 (discussed in more detail in FIG. 2 below). Therefore, at programmed measurement intervals (e.g., every second), each network node can initiate measurements (e.g., loss measurements and delay measurements) of one or more MEs that include the particular network node. Each network node can report measurements to metric device 110 at programmed reporting intervals (e.g., every minute). Measurements of MEs in the same MEG are reported to the same metric device when one or more metric devices exist in the environment 100. In some implementation, the reported measurements can include delay measurements and/or loss measurements measured for an ME, for example, according to Y.1731. The measurement report may include an MEG ID (e.g., MEG name and/or level) corresponding to the report data and MEP IDs of a reporting/local end point and a corresponding remote end point that are in a given ME. In some implementations, each network node can store measurements collected over a certain period (e.g., a day). As such, if connection to the metric device 110 is unavailable, the network node can report the stored measurements to the metric device 110 when the connection becomes available.

The metric device 110, as a measurements collector, receives measurement reports (e.g., delay measurement reports and/or loss measurement reports) from network nodes 104, 106, and 108. Measurement reports may arrive at the metric device 110 at different times. There is no requirement for the report arrival time to be synchronized. For example, the report arrival time may be determined by start time of the report on the reporting network node (e.g., the reporting network node may set the report time in the report message).

The metric device 110 stores the measurements in a measurement database and correlates the measurements based on MEG ID and local and remote MEP IDs (or ME ID) received with the measurement report. For example, the metric device 110 can correlate (e.g., group or link) loss measurements with delay measurements from the same ME in the same MEG based on the measurement reports for these measurements identifying a same MEG ID and/or MEP ID. In some implementations, measurements may be measured for different priorities of service. As a result, the metric device 110 can correlate loss measurements with delay measurements from the same ME, in the same MEG, at the same priority of service. For example, based on information included in the measurement report, the metric device 110 can identify a set of loss and delay measurements that were made at a same priority of service and received from the same ME. In this example, the metric device can group this set of loss and delay measurements together for purposes of reporting on messages sent at a specific priority of service.

The metric device 110 learns MEG topology by discovering the MEG ID and local and remote MEP IDs in the received measurement reports. In some implementations, when a measurement report is received, the metric device 110 first identifies the MEG ID and the local and remote MEP IDs in the measurement report. Then the metric device 110 determines whether the MEG ID is already included, for example, in a measurement database, and if not, the MEG ID is created in the measurement database. Next, the metric device 110 determines whether the local and remote MEP IDs are already included in the measurement database, and if not, the local and remote MEP IDs are created in the measurement database. As a result, the metric device 110 can learn MEG topology from received measurement reports. Because the metric device 110 receives reports from all measurement devices from Ethernet circuits in a monitored service area, the metric device 110 constructs the MEG configuration automatically without user provisioning. When MEG topology changes, the metric device 110 can learn the MEG topology change once measurement reports measuring the changed part of the MEG are received.

The metric device 110 constructs a measurement database for delay and loss measurements for all MEs in a MEG. Loss measurements are correlated to (e.g., linked to or paired with) delay measurements to determine the information required to perform, for example, MEF 10.2.1 availability calculations or other availability calculations. Using the loss and delay measurements, the availability calculations, and the discovered MEG topology, reports, including comprehensive Ethernet performance measurements of the entire MEG, may be generated and transmitted at periodic intervals to the metric portal server 112. The reports can be generated autonomously by the metric device 110 at regular intervals (e.g., push model) or the reports can be generated upon request by the metric portal server 112 (e.g., pull model).

In some implementations, the metric device 110 can calculate additional metrics based on the loss and/or delay measurements. For example, High Loss Interval (HLI) count and Consecutive High Loss Interval (CHLI) count can be calculated and stored in the database according to MEF 10.2.1. The HLI count and CHLI count can help service providers identify problems in the MEG. In some implementations, additional measurements can be stored in the database. For example, the total bandwidth and/or throughput a customer gets on a given ME in a given MEG, at a particular priority of service, can be stored in the database.

The metric device 110 can be can be implemented in a dedicated hardware state machine. The metric device 110 can also be implemented as special purpose logic circuitry, for example, a field-programmable gate array (FPGA) or an application specific integrated circuit (ASIC). The metric device 110 can be located anywhere in the environment 100 as long as it is routable (i.e., network nodes know where to send measurement reports). In some implementations, the metric device 110 may be located within the metric portal server 112. In some implementations, multiple metric devices can be deployed within a service area to distribute the load of, for example, MEF 10.2.1 calculations and reporting, while still maintaining a single portal for customer access. However, MEPs within a same MEG send their measurements report to the same metric device. In some implementations, the metric device 110 can be a single device or a cluster of devices that share a common database.

The metric portal server 112 receives MEG correlated reports from the metric device 110 and provides the reports to metric clients 116 and 118 that have subscribed to Ethernet service provided by the MEG 102. In some implementations, the metric portal server 112 receives Ethernet service queries from metric clients 116 and 118, and requests query results from the metric device 110.

The network 114 facilitates wireless or wireline communications between the components of the environment 100 with any other local or remote computer, such as additional MEGs, servers, or other devices communicably coupled to the network 114, including those not illustrated in FIG. 1. As illustrated in FIG. 1, the network 114 is depicted as a single network, but may be comprised of more than one network without departing from the scope of this disclosure.

In some implementations, one or more of the illustrated components may be included within network 114, for example, as one or more cloud-based services or operations. The network 114 may be all or a portion of an enterprise or secured network, while in another case, at least a portion of the network 114 may represent a connection to the Internet, a public switched telephone network (PSTN), a data server, a video server, or additional or different networks. In some implementations, a portion of the network 114 may be a virtual private network (VPN). Further, all or a portion of the network 114 can comprise either a wireline or wireless link. Example wireless links may include 802.11ac/ad/af/a/b/g/n, 802.20, WiMax, LTE, and/or any other appropriate wireless link. In other words, the network 114 encompasses any internal or external network, networks, sub-network, or combination thereof, operable to facilitate communications between various computing components, inside and outside the environment 100. The network 114 may communicate, for example, Internet Protocol (IP) packets, Frame Relay frames, Asynchronous Transfer Mode (ATM) cells, voice, video, data, and other suitable information between network addresses. The network 114 may also include one or more local area networks (LANs), radio access networks (RANs), metropolitan area networks (MANs), wide area networks (WANs), all or a portion of the Internet, and/or any other communication system or systems at one or more locations.

Figure 2:
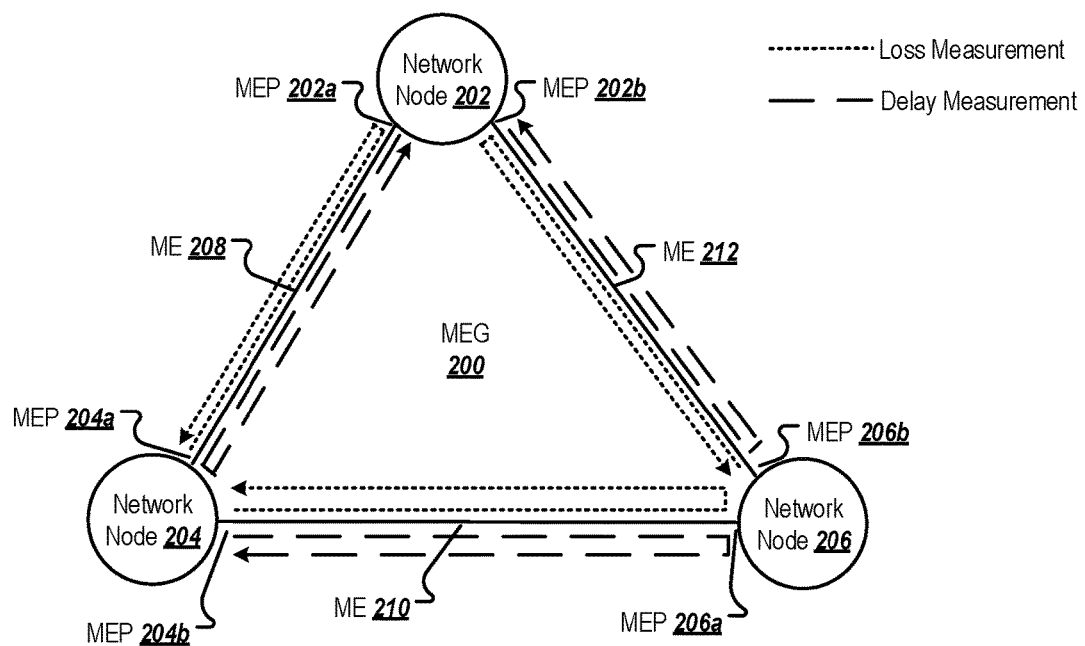
FIG. 2 is a diagram illustrating an example maintenance entity group (MEG) reporting structure.

FIG. 2 is a diagram illustrating an example maintenance entity group (MEG) 200 reporting structure. The MEG 200 shown in FIG. 2 is a three-node E-LAN circuit. In some implementations, the MEG 200 may include additional and/or different components not shown in the flow diagram. Components may also be omitted from the MEG 200. The components illustrated in FIG. 2 may be similar to or different from those described in FIG. 1.

The MEG 200 is uniquely defined by an MEG name and level (e.g., MEG name: TestMeg; Level: 3). The MEG level can be a number between 0 and 7, which is used to separate measurements across parts of a circuit. As illustrated in FIG. 2, the MEG 200 consists of three MEs 208, 210, and 212. The three MEs in the MEG 200 have the same MEG level. The ME 208 is defined by two MEPs of the ME 208, MEP 202a and MEP 204a. The ME 210 is defined by two MEPs of the ME 210, MEP 204b and MEP 206a. The ME 212 is defined by two MEPs of the ME 212, MEP 206b and MEP 202b.

As illustrated in FIG. 2, the MEG 200 includes three network nodes 202, 204, and 206. The network node 202 contains two MEPs, MEP 202a and MEP 202b. The network node 204 contains two MEPs, MEP 204a and MEP 204b. The network node 206 contains two MEPs, MEP 206a and MEP 206b. The delay measurement for ME 208 is initiated and reported by the network node 202, while the loss measurement for ME 208 is initiated and reported by the network node 204. Both the delay and loss measurements for ME 210 are initiated and reported by the network node 204. The delay measurement for ME 212 is initiated and reported by the network node 202, while the loss measurement for ME 212 is initiated and reported by the network node 206. In some implementations, each measurements report includes start time of the report on the reporting network node, MEG name and level corresponding to the report data, and local and remote MEP IDs. In some implementations, each measurements report also includes priority of service for the measurement. For the example MEG 200, each network node sends between one and three measurement reports (e.g., Y.1731 measurement reports) to a metric device at programmed intervals (e.g., every minute). In this example, network node 202 sends two measurement reports (i.e., delay measurement reports of ME 208 and ME 212) to the metric device at programmed intervals. Network node 204 sends three measurement reports (i.e., loss measurement reports of ME 208 and ME 210, and delay measurement report of ME 210) to the metric device at programmed intervals. Network node 206 sends one measurement report (i.e., loss measurement report of ME 212) to the metric device at programmed intervals. Although all measurements shown in FIG. 2 are bidirectional measurements, some or all of them can be unidirectional measurements.

Figure 3:
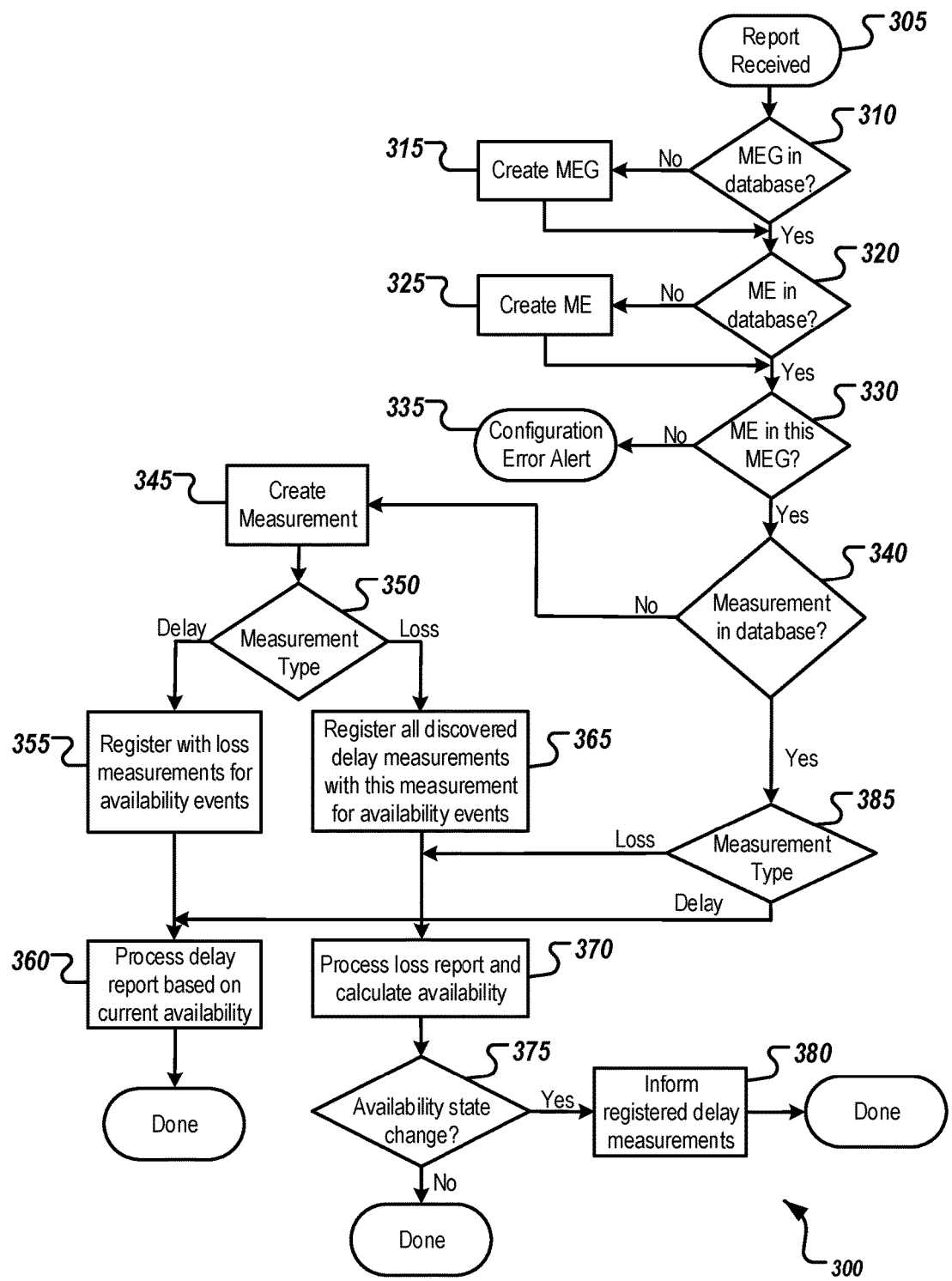
FIG. 3 is a flow chart illustrating an example method of MEG discovery and measurements correlation.

FIG. 3 is a flow chart illustrating an example method 300 of MEG discovery and measurements correlation. The example method 300 can be performed, for example, by one or more telecommunications devices, such as those described with reference to FIG. 1. The example method 300 can also be implemented as instructions stored on a non-transitory, computer-readable medium that, when executed by one or more telecommunications devices, configures the one or more telecommunications devices to perform and/or cause the one or more telecommunications devices to perform the actions of the example method 300.

A report is received (305). The report may be a delay measurement report or a loss measurement report. The report may be received by a metric device from a network node. The report may include an MEG name and level as well as local and remote MEP IDs, where measurements in the report are measured. It is determined whether the MEG in the report is already included in a database (310). For example, the MEG name and level are compared to information currently stored in the database to determine if the received report is from a new MEG (e.g., that is not currently listed in the database) or a known MEG (e.g., that is already listed in the database). If the MEG is in the database (i.e., a known MEG), then the method proceeds to action 320. If the MEG is not in the database (i.e., a new MEG), the MEG is created in the database (315) and then the method proceeds to action 320. The MEG can be created in the database, for example, by storing the MEG identifier in the database.

It is determined whether the ME in the report is already included in the database (320). For example, the local and remote MEP IDs are compared to information currently stored in the database to determine if the received report is from a new ME or a known ME. If the ME is in the database (i.e., a known ME), then the method proceeds to action 330. If the ME is not in the database (i.e., a new ME), the ME is created in the database (325) and then the method proceeds to action 330. The ME can be created in the database, for example, by storing the ME identifier in the database.

It is determined whether the ME is in the MEG (330). For example, an ME identifier in the report is compared to a set of ME identifiers that are stored in association with the MEG identifier in the measurement database. If the ME is not in the MEG (e.g., the ME identifier does not match any ME identifier that are stored in association with the MEG identifier in the measurement database), a configuration error alert is generated (335). The configuration error may be an MEP IDs conflict since the combination of MEG name and level and local and remote MEP IDs is unique. In some implementations, the method 300 ends after action 335. If the ME is in the MEG, then the method proceeds to action 340. From action 305 to action 330, MEG topology can be discovered or learned by the metric device through received reports. For example, new MEs are added to the MEG topology if the new MEs are not currently listed in the measurement database. As a result, provisioning the MEG configuration is not required at the metric device.

It is determined whether a measurement in the report already exists for the same ME/MEG pair in the database (340). In some implementations, additional entries can be created for different priorities of service under the same ME/MEG pair in the database. A measurement is determined to be unique (e.g., new) if its MEG ID (e.g., MEG name and/or level), ME ID (e.g., local and remote MEP IDs), measurement point (e.g., local MEP ID), measurement type, and priority are not the same as any existing measurement. For example, measurements at different priorities of the same ME are different measurements in the database. In addition, measurements measured by different local MEP IDs in the same ME are different measurements in the database. If the measurement is in the database, then the method proceeds to action 385. If the measurement is not in the database, the measurement is created in the database (345) and then the method proceeds to action 350. In some implementations, additional measurements, in addition to delay and loss measurements, can be stored in the database. For example, the total bandwidth and/or throughput a customer gets can be stored and correlated with the same ME/MEG pair in the database. When the customer gets more total bandwidth and/or throughput than those defined in a Service Level Agreement (SLA) during a period of time, the delay and loss measurements, as well as the availability metric in that period of time, may not be used to provide performance parameters to the customer. In some implementation, the delay and loss measurements during that period of time may be marked as unavailable. In some implementation, the delay and loss measurements during that period of time may not be marked as unavailable. Instead, the total bandwidth and/or throughput the customer is provided during that period of time are displayed when the performance parameters during that period of time are provided to the customer.

A measurement type in the report is determined (350). If the measurement type is delay measurement, then the delay measurement is registered with loss measurements stored in the database from the same ME/MEG pair (or the same ME/MEG/priority) for availability events (355). For example, the delay measurements and loss measurements of the same ME/MEG pair (or the same ME/MEG/priority) are correlated (e.g., linked or grouped together) in the database. The registered delay measurement may receive availability state change events caused by the loss measurement and use the events to track the availability state of the ME in calculating delay values. For example, when a new loss measurement is received, all other measurements in that ME are notified and registered with the loss measurement to receive availability state change events (e.g., start of unavailable interval, start of available interval). When a future state change event occurs, every registered recipient receives the state change event to track start and end of available/unavailable intervals. If a new delay measurement is received, a loss measurement on the same ME is searched, and if one or more loss measurements exist, the delay measurement registers for availability state change events with all loss measurements found on the same ME. The delay measurement report is processed based on the current availability state of the ME (360). For example, availability indicators of the processed delay measurements stored in the database may be set to the current availability of the ME. The method 300 ends after action 360.

If the measurement type is loss, then all discovered delay measurements in the database of the same ME/MEG pair (or the same ME/MEG/priority) are registered with the loss measurement (365). For example, the loss measurements and delay measurements of the same ME/MEG pair (or the same ME/MEG/priority) are correlated (e.g., linked) in the database. The loss report is processed to calculate availability of the ME (370). In some implementations, the availability calculation is performed, for example, according to MEF 10.2.1. For example, a current availability state of ME from available to unavailable (e.g., availability transition) is made when a sequence of consecutive loss measurements of the ME, each with a frame loss higher than a predetermined threshold, is identified. Once the current availability state of the ME is changed to unavailable, availability indicators of the sequence of consecutive loss measurements that were used to change the availability state of the ME may be changed to unavailable. In some implementations, measurements with availability indicators set to unavailable may not be used to calculate correct value of metrics for the ME. After the availability of the ME is calculated, it is determined whether the availability state of the ME changes (375). If the availability state of the ME does not change, then the method 300 ends. If the availability state of the ME changes, the registered delay measurements are informed (380). In some implementations, informing registered delay measurements includes change availability indicators of delay measurements within an unavailable interval of the ME. For example, availability indicators of delay measurements during a time period of the sequence of consecutive loss measurements may be changed to unavailable. The method 300 ends after action 380.

If the measurement is determined to be in the database at 340, a measurement type in the report is determined (385). For example, the measurement type can be set in the message report header by the reporting network node and determined by the metric device. If the measurement type is a delay measurement, then the method proceeds to action 360 described above. If the measurement type is a loss measurement, then the method proceeds to action 370 described above.

The example method 300 shown in FIG. 3 can be modified or reconfigured to include additional, fewer, or different actions (not shown in FIG. 3), which can be performed in the order shown or in a different order. For example, additional metrics, in addition to the availability metric, may be calculated and stored in the database after action 370. For example, the High Loss Interval (HLI) count and the Consecutive High Loss Interval (CHLI) count can be calculated and stored in the database based on MEF 10.2.1. The HLI count and CHLI count can help service providers identify problems in a circuit. In some implementations, there need to be "n" (e.g., 10) CHLI before a network monitored by an ME is considered unavailable. The network can have a large number of lost packets as measured by the loss measurement and still be considered available. For example, the network may lose packets exceeding the high loss threshold defined in the SLA (e.g., the threshold used to determine a high loss interval) 9 out of every 10 intervals (i.e., n is set to 10), and wouldn't be determined to be unavailable. The HLI count and CHLI count can provide indicators of network performance prior to reaching the unavailable state. The HLI count indicates the total number of intervals that have packet loss exceeding the SLA threshold in the reporting period. The CHLI count indicates the number of times that one or more consecutive intervals are above the SLA threshold. In addition, the maximum length of a CHLI in the reporting interval may be reported. By setting proper thresholds on these reported parameters, a network provider can identify a problem network before an unavailable period of the network has been reached, and can take proactive action to prevent the unavailable period. In some implementations, one or more of the actions shown in FIG. 3 can be repeated or iterated, for example, until a terminating condition is reached. In some implementations, one or more of the individual actions shown in FIG. 3 can be executed as multiple separate actions, or one or more subsets of the actions shown in FIG. 3 can be combined and executed as a single action.

Figure 4A:
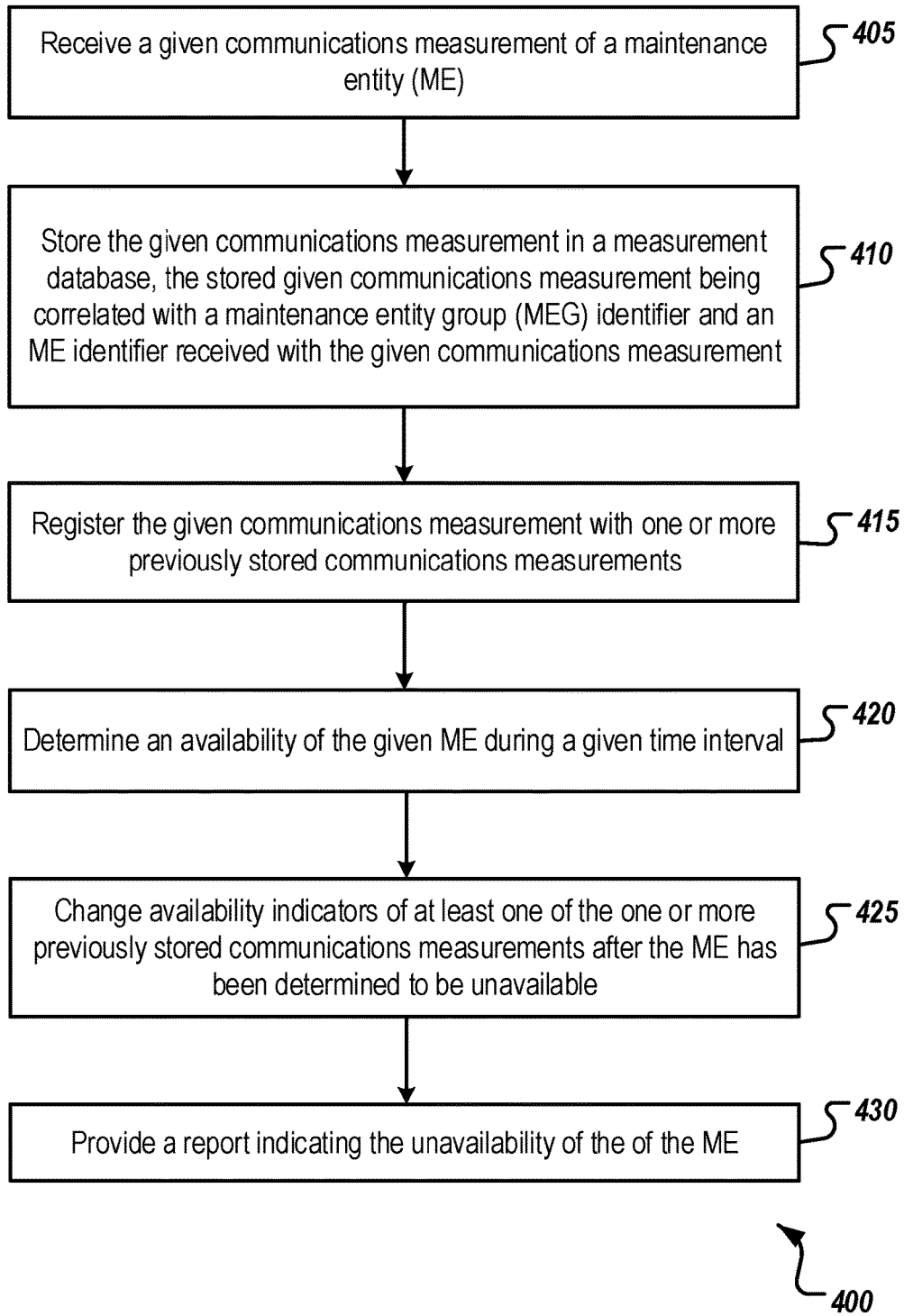
FIG. 4A is a flow chart of an example process for determining the availability of an ME.

FIG. 4A is a flow chart of an example process 400 for determining the availability of an ME. The example process 400 can be performed, for example, by one or more telecommunications devices, such as those described with reference to FIG. 1. The example process 400 can also be implemented as instructions stored on a non-transitory, computer-readable medium that, when executed by one or more telecommunications devices, configures the one or more telecommunications devices to perform and/or cause the one or more telecommunications devices to perform the actions of the example process 400.

A given communications measurement of a maintenance entity (ME) that includes a network node is received from the network node and by a metric device (405). The ME includes two network nodes. In some implementations, the network node reports communications measurements of the ME to the metric device at regular intervals (e.g., without receiving a request for the communications measurements from the metric device). The communications measurement of the ME can be a delay measurement and/or a loss measurement of the ME. The communications measurement can be measured, for example, according to Y.1731.

The given communications measurement is stored, by the metric device, in a measurement database (410). The stored given communications measurement is correlated with a maintenance entity group (MEG) identifier received with the given communications measurement and an ME identifier received with the given communications measurement. An MEG can include multiple MEs. In some implementations, the MEG identifier may include the MEG name and level. MEs in a same MEG have the same MEG level. The ME identifier may be represented by local and remote MEP IDs of the ME. The combination of MEG identifier and ME identifier is unique, and can be used to identify communications measurements for a particular ME in a particular MEG. In some implementations, in addition to the MEG identifier and the ME identifier, the stored given communications measurement is also correlated with a priority of service received with the given communications measurement. The combination of MEG identifier, ME identifier, and priority of service is unique, and can be used to identify communications measurements for a particular ME in a particular MEG at a particular priority of service.

The stored given communications measurement is registered, by the metric device, with one or more previously received communications measurements in the measurement database (415). A measurement (e.g., a delay or loss measurement) is registered the first time the measurement for that MEG/ME/priority is received and an entry in the measurement database is created. The measurement is correlated (e.g., matched with) other delay or loss measurements in the measurement database for that MEG/ME/priority when the measurement is registered. Each previously received communications measurement is associated with an availability indicator corresponding to an availability of the ME at a time the particular communications measurement was obtained. In some implementations, when the stored given communications measurement is determined to be a delay measurement, the stored given communications measurement is registered with one or more previously received loss measurements that are also correlated with the MEG identifier and ME identifier of the delay measurement. In some implementations, when the stored given communications measurement is determined to be a loss measurement, the stored given communications measurement is registered with one or more previously received delay measurements that are correlated with the same MEG identifier and the ME identifier as the delay measurement.

An availability of the ME during a given time interval is determined based on availability indicators of consecutive communications measurements for the ME (420). For example, when there are a sequence of consecutive loss measurements of the ME, each with a frame loss higher than a predetermined threshold, a current availability state of ME can be changed from available to unavailable. Availability indicators of at least one of the one or more previously received communications measurements are changed, by the metric device and in the measurement database, after the ME has been determined to be unavailable during the given time interval (425). For example, any correlated delay measurements of the ME within the given time interval can be marked as unavailable (e.g., set availability indicators to unavailable). In some implementations, the number of consecutive intervals for determining start of available/unavailable intervals is called the measurement "window size." For example, a typical value of "window size" is 10. Once high loss intervals start, there can be up to 9 consecutive intervals that are counted as high loss intervals while still be marked as available. If the $10^{th}$ consecutive interval measurement is received and is also counted as a high loss interval, the previous 9 consecutive intervals, along with the current interval (i.e., the $10^{th}$) are all marked as unavailable, and the unavailable interval starts from the $1^{st}$ interval of the 9 consecutive intervals in the past.

A report is provided, by the metric device, indicating the unavailability of the ME (430). In some implementations, the report is provided when the metric device is queried. In some implementations, the report is provided at programmed intervals.

The example process 400 shown in FIG. 4A can be modified or reconfigured to include additional, fewer, or different actions (not shown in FIG. 4A), which can be performed in the order shown or in a different order. For example, before 410, the MEG identifier received with the given communications measurement is compared, by the metric device, to a set of MEG identifiers that are stored in the measurement database. Based on the comparison, a determination is made that the MEG identifier is not included in the set of MEG identifiers. In response to the determination that the MEG identifier is not included in the set of MEG identifiers, a new MEG entry is created in the measurement database. The created new MEG entry includes the MEG identifier. The ME identifier received with the given communications measurement is compared, by the metric device, to a set of ME identifiers that are stored in association with the MEG identifier in the measurement database. Based on the comparison, a determination is made that the ME identifier is not included in the set of ME identifiers. In response to the determination that the ME identifier is not included in the set of ME identifiers associated with the MEG identifier, a new ME entry is created in the measurement database. The created new ME entry includes the ME identifier. The created ME entry is mapped to the MEG identifier to associate the created ME entry with the MEG identifier.

In some implementations, a measurement type being reported in the given communications measurement is determined. The measurement type is one of a loss measurement or a delay measurement.

In some implementations, when the determined measurement type being reported in the given communications measurement is a delay measurement, an availability indicator of the delay measurement is set to match an availability indicator of a corresponding loss measurement for a time of the delay measurement. A determination is made, at a time when the delay measurement was made, that the availability indicator of the corresponding loss measurement is set to available. At a later time, a determination is made that the ME is deemed unavailable for a time period that includes the time when the delay measurement was made. The availability indicator of the delay measurement is changed based on the determination that the ME was deemed unavailable during the time period that includes the time when the delay measurement was made.

In some implementations, when the determined measurement type being reported in the given communications measurement is a loss measurement, a determination is made, based on a current value and a specified number of previous values of the loss measurement for the ME, that the ME is deemed unavailable for a time period. Delay measurements stored in the measurement database registered with the loss measurement are informed that the ME is deemed unavailable for the time period. Availability indicators of every delay measurement, stored in the measurement database registered with the loss measurement and having a time when the particular delay measurement was made within the time period, are set to unavailable. For example, as shown in FIG. 4B, a loss measurement report of an ME is being processed when a current availability state of the ME is available. Even if an individual loss measurement has a high loss ratio, an availability indicator of that individual loss measurement is still set to the current availability state (i.e., available) since a specified number (i.e., 10) of consecutive high loss measurements has not been identified. As shown in FIG. 4C, the last loss measurement is processed and 10 consecutive high loss measurements have been identified. As a result, the current availability state of the ME is changed to unavailable. In addition, availability indicators of the 10 consecutive high loss measurements are changed to unavailable. Any correlated delay measurements of the ME within the newly determined unavailable interval of the ME (e.g., intervals between measured time of the first measure and measured time of the last measurement of the 10 consecutive high loss measurements) can be marked as unavailable.

In some implementations, one or more of the actions shown in FIG. 4A can be repeated or iterated, for example, until a terminating condition is reached. In some implementations, one or more of the individual actions shown in FIG. 4A can be executed as multiple separate actions, or one or more subsets of the actions shown in FIG. 4A can be combined and executed as a single action. In some implementations, one or more of the individual actions shown in FIG. 4A may also be omitted from the example process 400.

While this specification contains many specific implementation details, these should not be construed as limitations on the scope of any inventions or of what may be claimed, but rather as descriptions of features specific to particular embodiments of particular inventions. Certain features that are described in this specification, in the context of separate embodiments, can also be implemented in combination or in a single embodiment. Conversely, various features that are described in the context of a single embodiment can also be implemented in multiple embodiments, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
receiving, from a network node and by a metric device, a given communications measurement of a maintenance entity (ME) that includes the network node, wherein the ME includes two network nodes;
storing, by the metric device, the given communications measurement in a measurement database, wherein the stored given communications measurement is correlated with a maintenance entity group (MEG) identifier received with the given communications measurement and an ME identifier received with the given communications measurement, wherein an MEG includes multiple MEs;
registering, by the metric device, the stored given communications measurement with one or more previously received communications measurements, wherein each previously received communications measurement is associated with an availability indicator corresponding to an availability of the ME at a time the particular communications measurement was obtained;
determining, based on availability indicators of consecutive communications measurements for the ME, an availability of the ME during a given time interval;
changing, by the metric device and in the measurement database, availability indicators of at least one of the one or more previously received communications measurements after the ME has been determined to be unavailable during the given time interval; and
providing, by the metric device, a report indicating the unavailability of the ME.

2. The method of claim 1, further comprising:
comparing, by the metric device, the MEG identifier received with the given communications measurement to a set of MEG identifiers that are stored in the measurement database;
determining, based on the comparison, that the MEG identifier is not included in the set of MEG identifiers; and
creating a new MEG entry in the measurement database in response to the determination that the MEG identifier is not included in the set of MEG identifiers, wherein the created new MEG entry includes the MEG identifier.

3. The method of claim 1, further comprising:
comparing, by the metric device, the ME identifier received with the given communications measurement to a set of ME identifiers that are stored in association with the MEG identifier in the measurement database;
determining, based on the comparison, that the ME identifier is not included in the set of ME identifiers;
creating a new ME entry in the measurement database in response to the determination that the ME identifier is not included in the set of ME identifiers associated with the MEG identifier, wherein the created new ME entry includes the ME identifier; and
mapping the created ME entry to the MEG identifier to associate the created ME entry with the MEG identifier.

4. The method of claim 1, further comprising determining a measurement type being reported in the given communications measurement, wherein the measurement type is one of a loss measurement or a delay measurement.

5. The method of claim 4, wherein registering the stored given communications measurement with one or more previously received communications measurements comprises:
registering the delay measurement with one or more previously received loss measurements when the measurement type is determined to be the delay measurement, wherein each previously received loss measurement is correlated with the MEG identifier and the ME identifier; and registering the loss measurement with one or more previously received delay measurements when the measurement type is determined to be the loss measurement, wherein each previously received delay measurement is correlated with the MEG identifier and the ME identifier.

6. The method of claim 4, wherein the determined measurement type being reported in the given communications measurement is a delay measurement, the method further comprising:

setting an availability indicator of the delay measurement to match an availability indicator of a corresponding loss measurement for a time of the delay measurement.

7. The method of claim 6, further comprising:

determining, at a time when the delay measurement was made, that the availability indicator of the corresponding loss measurement is set to available; and at a later time, determining that the ME is deemed unavailable for a time period that includes the time when the delay measurement was made, wherein changing the availability indicators of at least one of the one or more previously received communications measurements after the ME has been determined to be unavailable comprises changing the availability indicator of the delay measurement based on the determination that the ME was deemed unavailable during the time period that includes the time when the delay measurement was made.

8. The method of claim 4, wherein the determined measurement type being reported in the given communications measurement is a loss measurement, the method further comprising:

determining, based on a current value and a specified number of previous values of the loss measurement for the ME, that the ME is deemed unavailable for a time period;

informing delay measurements stored in the measurement database registered with the loss measurement that the ME is deemed unavailable for the time period; and setting availability indicators of every delay measurement, stored in the measurement database registered with the loss measurement and having a time when the particular delay measurement was made within the time period, to unavailable.

9. A telecommunications device, comprising:

a communications interface that communicatively couples the telecommunications device with a plurality of network nodes;

a memory structure storing machine executable instructions; and one or more processors that execute the machine executable instructions and perform operations including:

receiving, from a network node among the plurality of network nodes, a given communications measurement of a maintenance entity (ME) that includes the network node, wherein the ME includes two network nodes;

storing the given communications measurement in a measurement database, wherein the stored given communications measurement is correlated with a maintenance entity group (MEG) identifier received with the given communications measurement and an ME identifier received with the given communications measurement, wherein an MEG includes multiple MEs;

registering the stored given communications measurement with one or more previously received communications measurements, wherein each previously received communications measurement is associated with an availability indicator corresponding to an availability of the ME at a time the particular communications measurement was obtained;

determining, based on availability indicators of consecutive communications measurements for the ME, an availability of the ME during a given time interval;

changing, in the measurement database, availability indicators of at least one of the one or more previously received communications measurements after the ME has been determined to be unavailable during the given time interval; and providing a report indicating the unavailability of the ME.

10. The device of claim 9, the operations further including:

comparing the MEG identifier received with the given communications measurement to a set of MEG identifiers that are stored in the measurement database;

determining, based on the comparison, that the MEG identifier is not included in the set of MEG identifiers; and creating a new MEG entry in the measurement database in response to the determination that the MEG identifier is not included in the set of MEG identifiers, wherein the created new MEG entry includes the MEG identifier.

11. The device of claim 9, the operations further including:

comparing the ME identifier received with the given communications measurement to a set of ME identifiers that are stored in association with the MEG identifier in the measurement database;

determining, based on the comparison, that the ME identifier is not included in the set of ME identifiers;

creating a new ME entry in the measurement database in response to the determination that the ME identifier is not included in the set of ME identifiers associated with the MEG identifier, wherein the created new ME entry includes the ME identifier; and mapping the created ME entry to the MEG identifier to associate the created ME entry with the MEG identifier.

12. The device of claim 9, the operations further including determining a measurement type being reported in the given communications measurement, wherein the measurement type is one of a loss measurement or a delay measurement.

13. The device of claim 12, wherein registering the stored given communications measurement with one or more previously received communications measurements comprises:

registering the delay measurement with one or more previously received loss measurements when the measurement type is determined to be the delay measurement, wherein each previously received loss measurement is correlated with the MEG identifier and the ME identifier; and registering the loss measurement with one or more previously received delay measurements when the measurement type is determined to be the loss measurement, wherein each previously received delay measurement is correlated with the MEG identifier and the ME identifier.

14. The device of claim 12, wherein the determined measurement type being reported in the given communications measurement is a delay measurement, the operations further including:

setting an availability indicator of the delay measurement to match an availability indicator of a corresponding loss measurement for a time of the delay measurement.

15. The device of claim 14, the operations further including:

determining, at a time when the delay measurement was made, that the availability indicator of the corresponding loss measurement is set to available; and at a later time, determining that the ME is deemed unavailable for a time period that includes the time when the delay measurement was made, wherein changing the availability indicators of at least one of the one or more previously received communications measurements after the ME has been determined to be unavailable comprises changing the availability indicator of the delay measurement based on the determination that the ME was deemed unavailable during the time period that includes the time when the delay measurement was made.

16. The device of claim 12, wherein the determined measurement type being reported in the given communications measurement is a loss measurement, the operations further including:

determining, based on a current value and a specified number of previous values of the loss measurement for the ME, that the ME is deemed unavailable for a time period;

informing delay measurements stored in the measurement database registered with the loss measurement that the ME is deemed unavailable for the time period; and setting availability indicators of every delay measurement, stored in the measurement database registered with the loss measurement and having a time when the particular delay measurement was made within the time period, to unavailable.

17. A system, comprising:

a plurality of network nodes, each network node configured to send communications measurements to a metric device; and the metric device configured to:

receive, from a network node among the plurality of network nodes, a given communications measurement of a maintenance entity (ME) that includes the network node, wherein the ME includes two network nodes;

store the given communications measurement in a measurement database, wherein the stored given communications measurement is correlated with a maintenance entity group (MEG) identifier received with the given communications measurement and an ME identifier received with the given communications measurement, wherein an MEG includes multiple MEs;

register the stored given communications measurement with one or more previously received communications measurements, wherein each previously received communications measurement is associated with an availability indicator corresponding to an availability of the ME at a time the particular communications measurement was obtained;

determine, based on availability indicators of consecutive communications measurements for the ME, an availability of the ME during a given time interval;

change, in the measurement database, availability indicators of at least one of the one or more previously received communications measurements after the ME has been determined to be unavailable during the given time interval; and provide to the metric portal server a report indicating the unavailability of the ME.

18. The system of claim 17, the metric device further configured to:

compare the MEG identifier received with the given communications measurement to a set of MEG identifiers that are stored in the measurement database;

determine, based on the comparison, that the MEG identifier is not included in the set of MEG identifiers; and create a new MEG entry in the measurement database in response to the determination that the MEG identifier is not included in the set of MEG identifiers, wherein the created new MEG entry includes the MEG identifier.

19. The system of claim 17, the metric device further configured to:

compare the ME identifier received with the given communications measurement to a set of ME identifiers that are stored in association with the MEG identifier in the measurement database;

determine, based on the comparison, that the ME identifier is not included in the set of ME identifiers;

create a new ME entry in the measurement database in response to the determination that the ME identifier is not included in the set of ME identifiers associated with the MEG identifier, wherein the created new ME entry includes the ME identifier; and map the created ME entry to the MEG identifier to associate the created ME entry with the MEG identifier.

20. The system of claim 17, the metric device further configured to determine a measurement type being reported in the given communications measurement, wherein the measurement type is one of a loss measurement or a delay measurement.

* * * * *